United States Patent
Allert

[11] Patent Number: 6,129,479
[45] Date of Patent: Oct. 10, 2000

[54] POSITIONING CLAMP AND METHOD OF MAKING THEREOF

[75] Inventor: Kurt Allert, Oberndorf, Germany

[73] Assignee: Hans Oetiker AG Maschinen-und Apparatefabrik, Horgen, Switzerland

[21] Appl. No.: 08/987,717

[22] Filed: Dec. 9, 1997

[30] Foreign Application Priority Data

Dec. 9, 1996 [DE] Germany .............................. 196 50 985

[51] Int. Cl.[7] ................................................. B25G 3/20
[52] U.S. Cl. ..................... 403/362; 403/236; 403/374.3; 24/278; 24/135 N; 248/295.11
[58] Field of Search ................. 403/21, 22, 362, 403/235, 236, 379.3, 378, 398, 374.3; 24/278, 135 N, 569, 525; 248/125.1, 295.11, 230.1, 413

[56] References Cited

U.S. PATENT DOCUMENTS

| | | |
|---|---|---|
| 1,447,253 | 3/1923 | La Fon .............................. 24/135 N X |
| 1,661,868 | 3/1928 | Armstrong et al. . |
| 2,578,860 | 12/1951 | Tetzlaff ..................... 24/278 |
| 2,842,387 | 7/1958 | Della-Porta . |
| 3,061,339 | 10/1962 | Jewell ..................... 24/278 X |
| 3,086,270 | 4/1963 | Zartler ....................... 24/278 |
| 3,407,448 | 10/1968 | Tetzlaff et al. ......................... 24/278 X |
| 3,709,633 | 1/1973 | Wooden ............................... 403/362 X |
| 3,849,008 | 11/1974 | Boucher et al. . |
| 4,300,270 | 11/1981 | Sauer . |
| 4,657,424 | 4/1987 | Dong . |
| 5,180,266 | 1/1993 | Nolan et al. . |
| 5,662,427 | 9/1997 | Chen ....................... 403/362 |

FOREIGN PATENT DOCUMENTS

| | | |
|---|---|---|
| 1961832 | 8/1967 | Germany . |
| 66 08 045 | 9/1968 | Germany . |
| 2 086 467 | 5/1982 | United Kingdom . |

*Primary Examiner*—Terry Lee Melius
*Assistant Examiner*—David E. Bochna
*Attorney, Agent, or Firm*—Darby Darby

[57] ABSTRACT

A positioning clamp with a ring-shaped base body and at least one substantially radial clamping mechanism associated with the base body. The base body (2) is formed as a deep-drawing part (31) and provided with a pocket (8) which is formed concurrently during deep-drawing, for at least partially receiving the substantially radial clamping mechanism (9). In addition, a method for making a positioning clamp is described.

9 Claims, 3 Drawing Sheets

POSITIONING CLAMP AND METHOD OF MAKING THEREOF

BACKGROUND OF THE INVENTION

1. Field of the Invention

The present invention relates to a positioning clamp with a ring-shaped base body and at least one radial clamping means associated with the base body.

2. Description of the Related Art

Positioning clamps of the aforedescribed type are known in the art. They are manufactured as a turned piece in the shape of a ring. A radial clamping means in form of a threaded screw is inserted into a threaded bore extending in the radial direction through the ring. By tightening the threaded screw a radial tension force can be applied, for example for securing the positioning clamp on a shaft or for clamping a component to a shaft with a radial force. The conventional positioning clamps which are turned from solid stock, are expensive to manufacture and require a sizable quantity of material. This results in high cost.

SUMMARY OF THE INVENTION

It is the object of the invention to provide a positioning clamp of the aforedescribed type which is simple and cost-effective to manufacture, and which is very strong.

The object is solved with the invention in that the base body is formed as a deep-drawing part and provided with a pocket formed concurrently during deep-drawing, for at least partially receiving the radial clamping means. By manufacturing the positioning clamp from a simple plate-like blank, such as a sheet metal blank, the deep-drawing process of the invention can be used to form a ring-shaped base body as a light-weight component which is at least as strong as the conventional positioning clamp machined as a turned part. In order to transmit a large enough radial force with the relatively thin jacket wall of the positioning clamp of the invention, a pocket is formed during the same deep-drawing step for receiving the radial clamping means. The retainer space of the pocket is adapted to receive, for example, an internally threaded insert, with the threaded clamping screw screwed into the insert. The wall of the insert is sufficiently thick so that a female thread of adequate length can be formed, so that the threaded clamping screw inserted into the female thread can exert a large radial clamping force without damaging the threads. The positioning clamp is preferably machined by using a follow-on composite tool in, for example, two pre-draw steps and one redraw step. Thereafter, the cup is stamped to partially remove the bottom of the cup for creating an opening, leaving the base body with a ring-shaped jacket wall. In the vicinity of the pocket, the jacket wall widens in the radial direction so as to conform to the desired shape of the pocket. At least this one pocket is formed; however, several more spaced-apart pockets can also be formed along the circumference of the positioning clamp for receiving additional radial clamping means. If the positioning clamp is, for example, disposed on a rotating shaft and rotates during operation, then the mass can be advantageously balanced by using two diametrically opposed pockets, each having respective clamping means. This does not only guarantee a uniform mass distribution, but also provides additional radial clamping means for attachment at additional points around the circumference. It is also possible to have more than two diametrically opposed pockets, such as three pockets offset by 120° or more than three pockets.

As a further improvement of the invention, there is provided a radial reinforcement edge formed by the flange of the deep-drawing part. This reinforcement edge is located on one of the marginal end faces of the jacket wall and consequently represents the "rest" of the blank which was not deformed at all or was deformed only slightly in this region.

Moreover, it is advantageous if the thickness of the reinforcement edge is identical to or less than the thickness of the blank used for the deep-drawing process. If the positioning clamp is manufactured from a sheet steel blank, then the reinforcement edge has about the same the thickness as the sheet steel. For other applications, the positioning clamps can also be fabricated from plastic rather than metal blanks, since plastic blanks can also be deep-drawn. Deep-drawing is preferably accomplished by cold-forming, regardless of the material. Alternatively, the blanks can be heated before deep-drawing. In the region of the reinforcement edge, the inner side wall of the base body, i.e. the marginal end face of the jacket wall in that region, is funnel-shaped, i.e. its radial width increases in the axial direction. The increase in width is a direct result of the deep-drawing process wherein the blank is pressed into a die by the help of a stamp, with the shape of the opening matching the shape of the die opening.

The pocket preferably receives an internally threaded insert adapted to conform with the radial clamping means and prevented from rotating with the radial clamping means when the radial clamping means is tightened. For preventing rotation, the insert is preferably shaped as a polygon, with very little clearance left between the pocket and the insert.

Most advantageously, the internally threaded insert is a threaded nut.

According to a further improvement of the invention, the pocket is formed by an approximately U-shaped region of the jacket wall of the base body. The U-shaped region further includes a bridge and two legs adjoining the bridge. A threaded locking screw extending through an opening penetrating the bridge is screwed into the internally threaded insert.

If the opening is smaller than the dimension of the internally threaded insert and smaller than a head of the threaded clamping screw located outside the bridge, then the radial clamping means is captively held on the base body. This permits quick installation with only a few operations.

In particular, a bottom extending from the bridge and the two legs can be formed as a single piece with the bridge and the two legs. The bottom is a "surplus" of the blank pressed into the die opening by the end face of the stamp, i.e. of the aforementioned bottom of the cup. The bottom strengthens the positioning clamp mechanically and provides a defined stop for insertion of the radial clamping means. Moreover, the bottom serves as an additional mechanism for preventing the internally threaded insert from rotating.

The invention furthermore relates to a method for fabricating a positioning clamp, wherein a blank, preferably in form of a plate or sheet metal, is deep-drawn and subsequently stamped to form a ring-shaped structure. The term "stamping" is used to describe the separation of the "bottom of the receptacle" which is formed during the deep-drawing process, in predetermined regions, wherein the remaining wall of the receptacle thereafter forms the jacket wall of the positioning clamp.

Preferably, the jacket wall is deformed outwardly in a radial direction over a certain region during deep-drawing, thereby creating a pocket for receiving a radial clamping means.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is illustrated in the drawing with reference to an embodiment. In the drawing is shown in.

DETAILED DESCRIPTION OF THE PRESENTLY PREFERRED EMBODIMENTS

Figure 1:
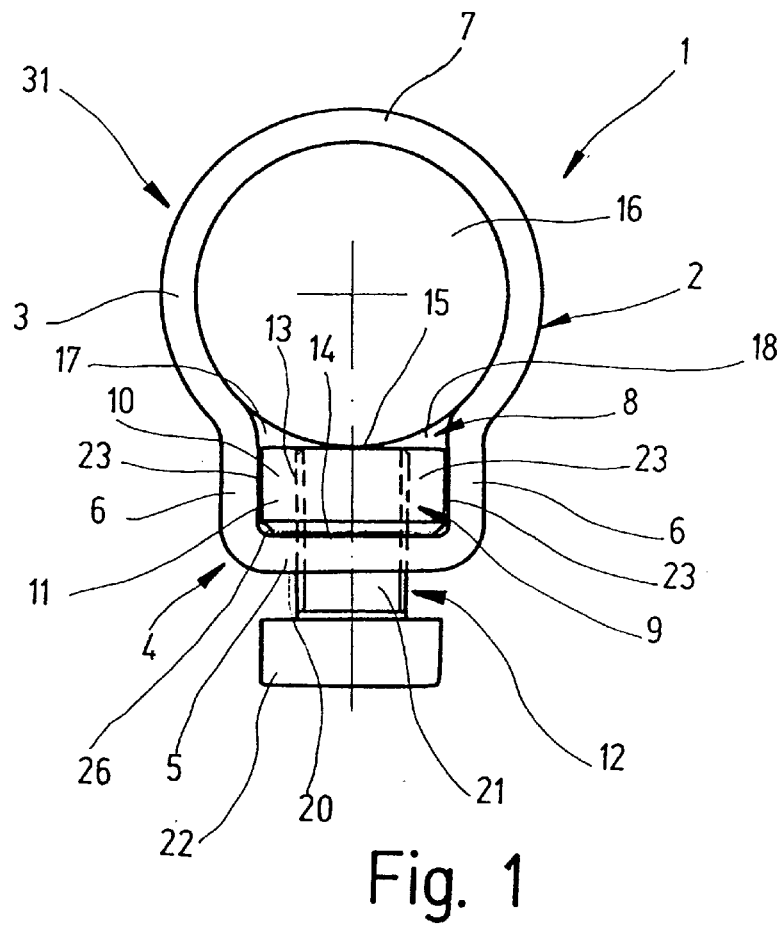
FIG. 1 a top plan view of a positioning clamp.
Figure 2:
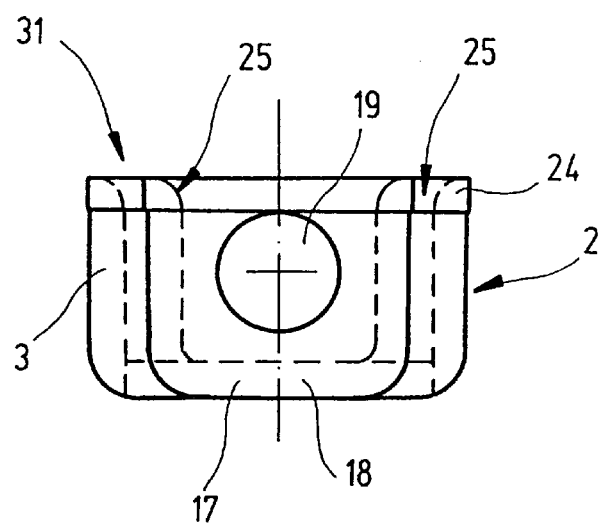
FIG. 2 an front view of a pocket of the positioning clamp.
Figure 3:
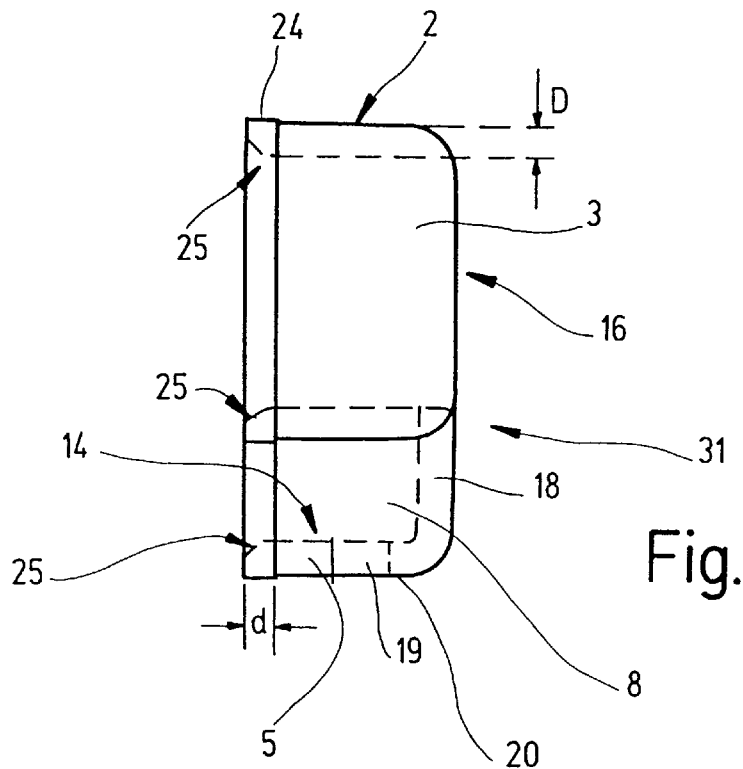
FIG. 3 a side view of the positioning clamp of FIG. 1 with the radial clamping means removed, FIG. 4 the top plan view of FIG. 1, again with the radial clamping means removed, FIG. 5 an internally threaded insert associated with the radial clamping means and formed as a threaded nut, FIG. 6 a threaded locking screw with a conical head, and FIG. 7 a threaded locking screw with a cylindrical head.
Figure 4:
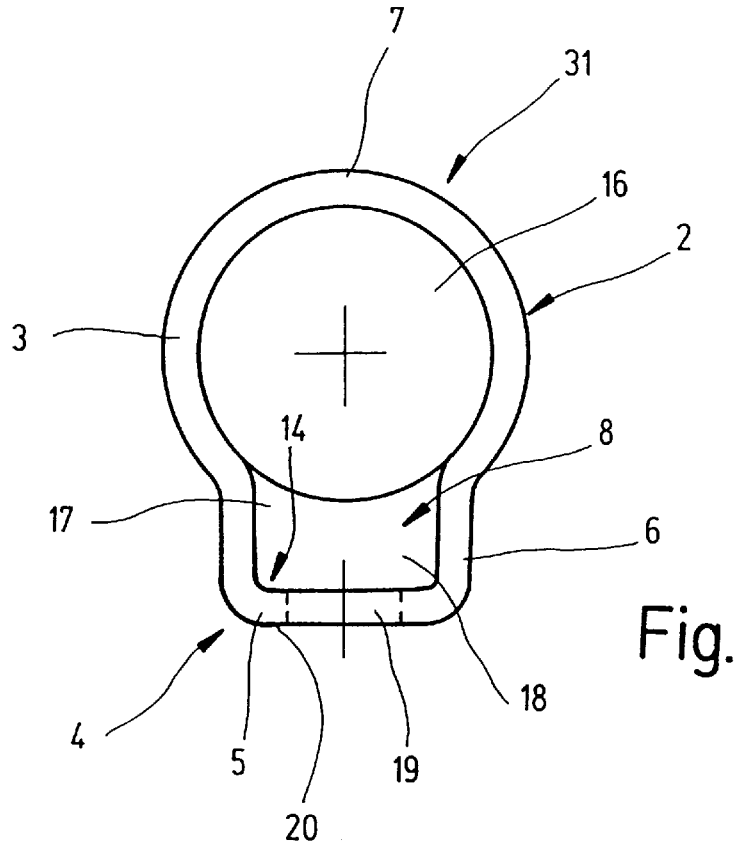

Referring now to FIG. 1, there is shown a positioning clamp 1 which is fabricated as a deep-drawing part 31 by cold-forming. The positioning clamp 1 has a ring-shaped base S body 2 forming a jacket wall 3. A region 4 of the jacket wall 3 is enlarged in the radial direction in the shape of a U. The U-shape is formed in a single piece by a bridge 5 and two adjoining legs 6. The contour of the remaining region 7 of the jacket wall 3 is that of a partial circle.

The U-shaped region 4 forms a pocket 8 for receiving a radial clamping means 9 comprised of an internally threaded insert 10 in the form of a threaded nut 11 and a threaded locking screw 12 which is inserted into a female thread 13 of the threaded nut 11. In this arrangement, the threaded nut 11 is supported by the interior surface 14 of the bridge 5. The side 15 of the threaded nut 11 facing away from the support surface abuts an opening 16 which is mostly surrounded by the jacket wall 3 forming a partial circle. During the fabrication of the positioning clamp 1, the opening 16 is formed by stamping after deep-drawing.

The region 17 located proximate to the pocket 8 and abutting the opening 16 forms a bottom 18 which is connected as a single piece with both the marginal portions of bridge 5 and the two legs 6. An opening 19 extending through the bridge 5 is preferably also made by a stamping process. The opening 19 is formed and placed such as to align with the female thread 13 of the threaded nut 11. In this way, the threaded locking screw 12 can be inserted—from the outside 20 of the bridge 5—into the base body 2, with a threaded shank 21 of the threaded locking screw 12 extending through the opening 19 and screwed into the female thread 13 of the threaded nut 11. The threaded locking screw 12 has a head 22, wherein the diameter of the head 22 is larger than the diameter of the opening 19. The internally threaded insert 10 has a polygonal contour, such as for example a threaded square nut, with three of the four sides 23 of the nut facing the inner surfaces of the legs 6 and the inside of bottom 18. With this arrangement, the internally threaded insert 10 is prevented from rotating in the pocket 8.

A reinforcement edge 24 which extends in a radial direction, is formed by the flange extending along the circumference of the base body 2 of the deep-drawing part during deep-drawing and represents the region of the blank which is not pressed into the die opening by the stamp. The reinforcement edge 24 improves the overall mechanical strength and rigidity of the component. The thickness d of the reinforcement edge is approximately identical to the thickness D of the blank used in the deep-drawing process. The thickness D is approximately identical to the wall thickness of the jacket wall 3.

In the region of the reinforcement edge 24, the interior surface 25 of the jacket wall 3 is formed in such a way that the radius of the surface 25 increases along the axial direction. This corresponds to a convex chamfer.

Figure 5:
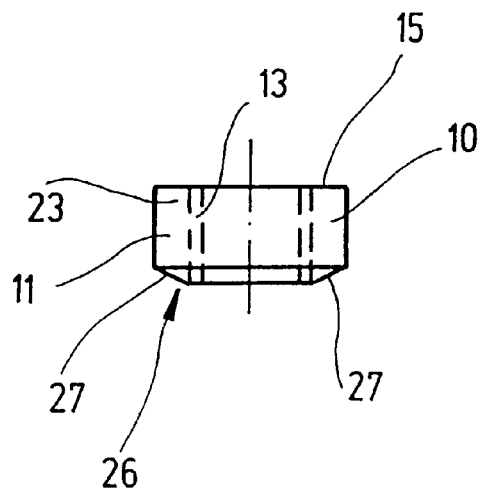
Figure 7:
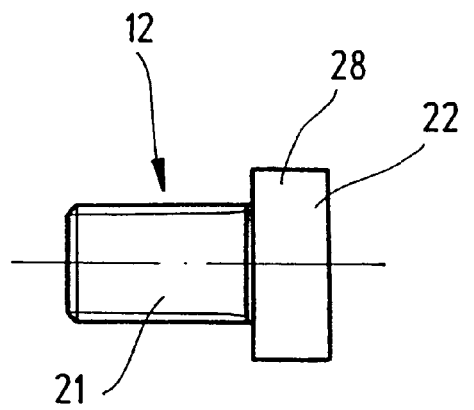

In FIG. 5 there is illustrated the aforedescribed internally threaded insert 10 which is formed as a threaded square nut 11, with the female thread 13 extending therethrough. The end face 26 of the threaded nut 11 associated with the interior surface 14 of the base body 2 includes marginal bevels 27 for providing good contact to both the interior surface 14 of the bridge 5 and the legs 6 near the corners of the bridge 5. In FIG. 7 there is depicted the threaded locking screw 12 of FIG. 1 which includes the threaded shank 21 and the head 22 formed as a cylinder head 28. On the cylinder head 28, there are provided respective engagement means for engaging a rotating tool, such as a screwdriver.

Figure 6:
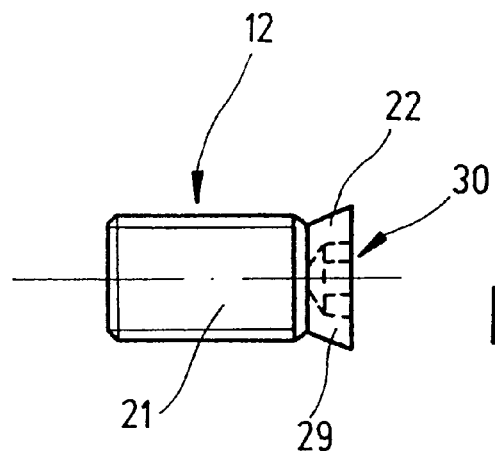

In FIG. 6 there is depicted another embodiment of a threaded locking screw 12 having a threaded shank 21 abutting a head 22 shaped as a conical head 29. The largest diameter of the cone is larger than the diameter of the opening 19 so that the radial clamping means 9 is again held captive, as discussed above. The conical head 29 is provided with a polygonal socket 30 for engaging a respective fastening tool.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A positioning clamp comprising:

a jacket wall including a circular base body defining an axis;

at least one radial clamping mechanism oriented substantially perpendicular to the axis defined by the circular base body;

a pocket disposed in the jacket wall and extending radially from the circular base body for at least partially receiving the at least one radial clamping mechanism within; and the jacketwall further including a flange forming a reinforcement edge, and an interior surface of which a portion thereof proximate to the reinforcement edge widens in a radial direction toward the reinforcement edge.

2. The positioning clamp of claim 1, wherein the jacket wall has a radial thickness and the reinforcement edge has a thickness no greater than the radial thickness of the jacket wall.

3. The positioning clamp of claim 1, wherein the at least one radial clamping mechanism comprises an internally threaded insert located within the pocket, wherein the pocket is adapted to prevent the internally threaded insert from rotating therein.

4. The positioning clamp of claim 3, wherein the internally threaded insert comprises a threaded nut.

5. The positioning clamp of claim 3, wherein the pocket comprises a generally U-shaped region having two legs and a bridge portion connecting the legs, the bridge having an opening therethrough, the at least one radial clamping mechanism further including a screw extending through the opening in a direction essentially perpendicular to the axis defined by the circular base body, the screw being capable of at least partially engaging the internally threaded insert.

6. The positioning clamp of claim 5, wherein the screw includes a head and wherein the screw head and the internally threaded insert are dimensioned so as to be larger than the opening in the bridge.

7. The positioning clamp of claim 5, the pocket further comprising a bottom integral with and extending from the bridge and the two legs.

8. The positioning claim of claim 7, wherein at least one of the bottom and the two legs are adapted to prevent the internally threaded insert from rotating within the pocket.

9. The positioning clamp of claim 7, wherein the bottom is located at an end face of the jacket wall opposite the reinforcement edge.

\* \* \* \* \*